(12) United States Patent
Hamou et al.

(10) Patent No.: US 10,375,121 B2
(45) Date of Patent: Aug. 6, 2019

(54) MICRO-SEGMENTATION IN VIRTUALIZED COMPUTING ENVIRONMENTS

(71) Applicant: VMware, Inc., Palo Alto, CA (US)

(72) Inventors: Claude Hamou, Palo Alto, CA (US); Roman Brouk, Palo Alto, CA (US); Steven McAllister, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 217 days.

(21) Appl. No.: 15/629,741

(22) Filed: Jun. 22, 2017

(65) Prior Publication Data

US 2017/0374106 A1 Dec. 28, 2017

Related U.S. Application Data

(60) Provisional application No. 62/353,566, filed on Jun. 23, 2016.

(51) Int. Cl.
| | |
|---|---|
| *G06F 9/455* | (2018.01) |
| *H04L 12/24* | (2006.01) |
| *H04L 12/46* | (2006.01) |
| *H04L 29/06* | (2006.01) |
| *H04L 29/08* | (2006.01) |

(52) U.S. Cl.
CPC ........ *H04L 63/205* (2013.01); *G06F 9/45558* (2013.01); *H04L 41/0803* (2013.01); *H04L 63/0263* (2013.01); *H04L 63/1408* (2013.01); *H04L 63/1441* (2013.01); *H04L 67/10* (2013.01); *G06F 9/45533* (2013.01); *G06F 2009/45587* (2013.01); *G06F 2009/45595* (2013.01); *H04L 12/4641* (2013.01)

(58) Field of Classification Search
None
See application file for complete search history.

(56) References Cited

U.S. PATENT DOCUMENTS 9,560,081 B1 * 1/2017 Woolward .............. H04L 63/20
10,129,096 B2 * 11/2018 Holkkola ................ H04L 41/22
(Continued)

OTHER PUBLICATIONS

Smith, Randy, "Severing the Horizontal Kill Chain: The Role of Micro-Segmentation in Your Virtualization Infrastructure", Oct. 12, 2016, Randy's Blog on Infosec and Other Stuff, p. 1-5.*
(Continued)

*Primary Examiner* — Christopher A Revak
(74) *Attorney, Agent, or Firm* — SU IP Consulting (57) ABSTRACT

Example methods are provided for an entity to perform micro-segmentation in a virtualized computing environment that includes multiple hosts. The method may comprise obtaining application implementation information associated with one or more applications implemented by multiple virtualized computing instances, each of the multiple virtualized computing instances being supported by one of the multiple hosts. The method may further comprise detecting micro-segments by clustering the multiple virtualized computing instances based on the application implementation information, and determining security policies for respective detected micro-segments. Each of the detected micro-segments may include one or more of the multiple virtualized computing instances that have more similarity compared to those in a different detected micro-segment.

21 Claims, 9 Drawing Sheets

(56) References Cited

U.S. PATENT DOCUMENTS

| | | | | |
|---|---|---|---|---|
| 10,158,672 | B2* | 12/2018 | Shieh | H04L 63/20 |
| 2016/0191463 | A1* | 6/2016 | Mohanty | H04L 63/0227 |
| | | | | 726/11 |
| 2017/0005987 | A1* | 1/2017 | Masurekar | G06F 16/25 |
| 2017/0054758 | A1* | 2/2017 | Maino | H04L 41/5025 |
| 2017/0064749 | A1* | 3/2017 | Jain | G06F 16/9024 |
| 2017/0078168 | A1* | 3/2017 | Harris, Jr. | G06F 9/45558 |
| 2017/0118173 | A1* | 4/2017 | Arramreddy | H04L 63/0236 |
| 2017/0353498 | A1* | 12/2017 | Huang | H04L 63/20 |
| 2018/0176102 | A1* | 6/2018 | Bansal | H04L 43/026 |
| 2018/0176252 | A1* | 6/2018 | Nimmagadda | H04L 63/20 |
| 2018/0176261 | A1* | 6/2018 | Bansal | H04L 63/205 |
| 2018/0183757 | A1* | 6/2018 | Gunda | G06F 9/45558 |

OTHER PUBLICATIONS

"Data Center Microsegmentation: Enchance Security for Data Center Traffic", Jan. 29, 2018, Cisco, p. 1-4.*

"Microsegennentation with Cisco ACI", no date provided, Cisco, p. 1-22.*

"Unisys to Deliver Enterprise Security Innovation on the AWS Cloud", Jan. 19, 2016, Unisys News Release, p. 1-5.*

* cited by examiner

Security Policy for MS1

| Src IP | Src PN | Dest IP | Protocol | Action | |
|---|---|---|---|---|---|
| $IP_1$ (App1-w1) | 1521 | $IP_4$ (App1-d1) | TCP | ALLOW | 512 |

520

Security Policies for MS2

| Src IP | Src PN | Dest IP | Protocol | Action | |
|---|---|---|---|---|---|
| $IP_2$ (App2-w1) | 443 | $IP_7$ (App2-a1) | TCP | ALLOW | 522 |
| $IP_7$ (App2-a1) | 1521 | $IP_3$ (App2-d1) | TCP | ALLOW | 524 |

530

Security Policies for MS3

| Src IP | Src PN | Dest IP | Protocol | Action | |
|---|---|---|---|---|---|
| $IP_5$ (App3-w1) | 443 | $IP_8$ (App3-a1) | TCP | ALLOW | 532 |
| $IP_8$ (App3-a1) | 1521 | $IP_6$ (App3-d1) | TCP | ALLOW | 534 |

540

Shared Security Policy for MS1, MS2 and MS3

| Src IP | Src PN | Dest IP | Protocol | Action | |
|---|---|---|---|---|---|
| Any | 53 | $IP_{DNS}$ | TCP | ALLOW | 542 |

MICRO-SEGMENTATION IN VIRTUALIZED COMPUTING ENVIRONMENTS

CROSS-REFERENCE TO RELATED APPLICATION

The present application claims the benefit of U.S. Provisional Application No. 62/353,566, filed Jun. 23, 2016, which is incorporated herein by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, to secure a SDDC, perimeter security solutions have been used to inspect the so-called "north-south traffic" (i.e., traffic into and out of a SDDC) to keep threats on the outside of the SDDC. However, although usually effective at the perimeter of the SDDC, these perimeter security solutions are not designed to inspect east-west traffic within the SDDC. In this case, if an attacker is able to penetrate into the SDDC, devices within the SDDC may be at risk.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
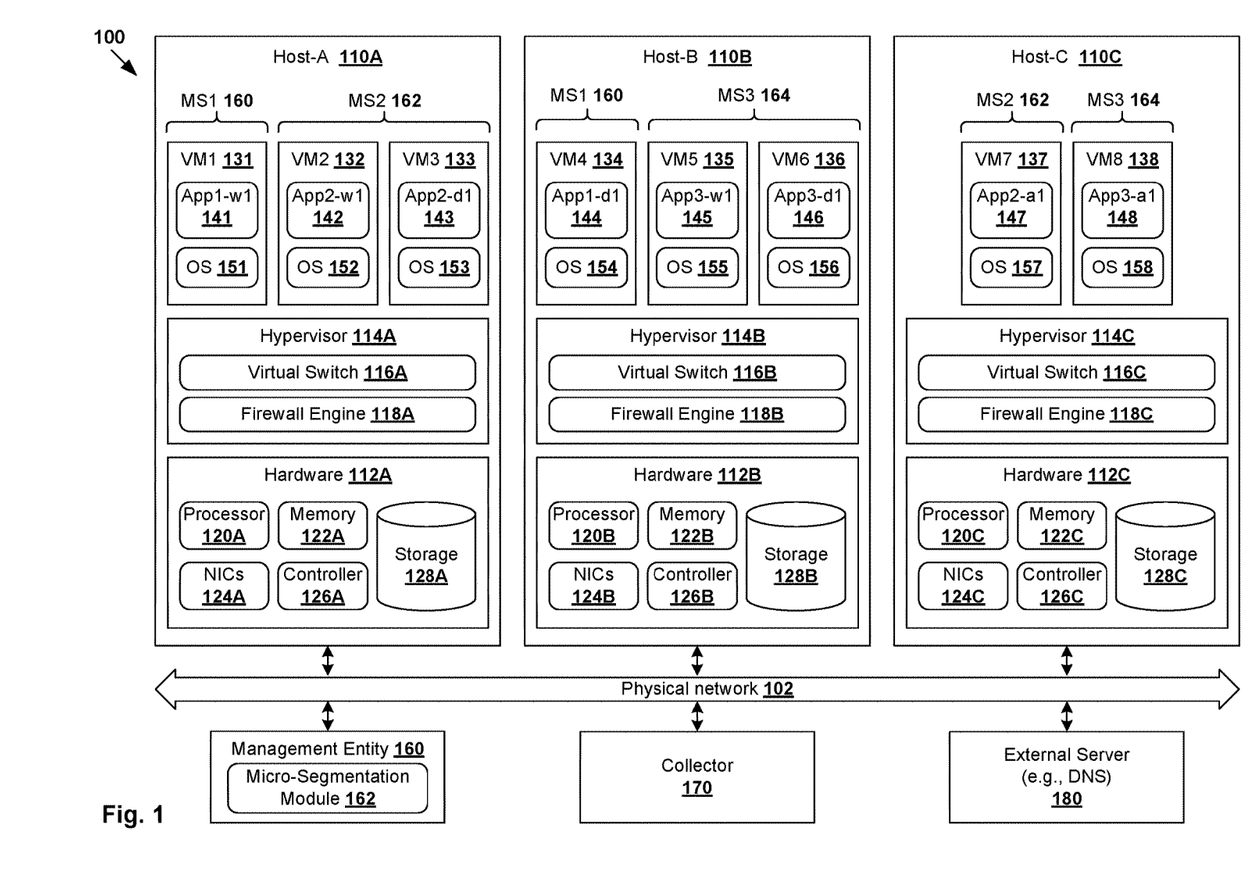
FIG. 1 is a schematic diagram illustrating an example virtualized computing environment in which micro-segmentation may be performed.

Challenges relating to data center security will now be explained in more detail below. FIG. 1 is a schematic diagram illustrating an example virtualized computing environment 100 in which micro-segmentation may be performed. It should be understood that, depending on the desired implementation, virtualized computing environment 100 may include additional and/or alternative component(s) than that shown in FIG. 1.

Virtualized computing environment 100 includes multiple hosts, such as host-A 110A, host-B 110B and host-C 110C that are connected via a physical network 102. Each host 110A/110B/110C includes suitable hardware 112A/112B/112C and virtualization software (e.g., hypervisor 114A/114B/114C) to support virtual machines. For example, host-A 110A supports "VM1" 131, "VM2" 132 and "VM3" 133; host-B 110B supports "VM4" 134, "VM5" 135 and "VM6" 136; and host-C 110C supports "VM7" 137 and "VM8" 138. Although three hosts are shown for simplicity, each host (also known as a "computing device", "host computer", "host device", "physical server", "server system", etc.) may be supporting tens or hundreds of virtual machines in practice.

Hypervisor 114A/114B/114C maintains a mapping between underlying hardware 112A/112B/112C and virtual resources allocated to respective virtual machines. Hardware 112A/112B/112C includes suitable physical components, such as Central Processing Unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to virtual machines 131-138 to support respective applications 141-148 running on top of respective guest operating systems 151-157, etc. For example, corresponding to hardware 112A/112B/112C, the virtual resources may include virtual CPU, virtual memory, virtual disk, virtual network interface controller (vNIC), etc. In practice, hypervisor 114A/114B/114C implements virtual machine monitors (not shown for simplicity) to emulate hardware resources.

Hypervisor 114A/114B/114C implements virtual switch 116A/116B/116C to handle traffic forwarding to and from virtual machines. For example, "VM1" 131 may communicate with "VM4" 134 during a communication session. In this case, at host-A 110A, virtual switch 116A sends packets (i.e., egress packets) from "VM1" 131 that are destined for "VM4" 134 on host-B 110B via physical network 102. At host-B 110B, virtual switch 116B receives the packets (i.e., ingress packets) via physical network 102 and forwards them to "VM4" 134 accordingly. As used herein, the term "packet" may refer generally to a group of bits that can be transported together, and may be in another form, such as "frame", "message", "segment", etc.

Physical network 102 may include any suitable number of interconnected physical network devices (not shown for simplicity), such as layer-3 routers, layer-2 switches, gateway devices, etc. Depending on the network topology in virtualized computing environment 100, a "switch" may be an access layer switch, top-of-rack (ToR) switch, aggregate switch, spine switch, etc. The term "layer-2" generally refers to a Media Access Control (MAC) layer, "layer-3" to a network layer and "layer-4" to a transport layer in the Open System Interconnection (OSI) model, although the concepts described herein may be applicable to other networking models.

Management entity 160 provides management functionalities to manage and configure various "objects" in virtualized computing network 100, such as hosts 110A-110C, virtual machines 131-138, etc. In practice, management entity 160 may be implemented using one or more virtual or physical entities. For example, management entity 160 may be a component of a network virtualization platform (e.g., VMware's NSX, a trademark of VMware, Inc.). Through network virtualization, benefits similar to server virtualization may be derived for networking services by virtualizing network resources (e.g., hardware switches) to support software-based virtual networks. Such virtual networks may be provisioned, changed, deleted and restored programmatically without having to reconfigure the underlying physical hardware or topology.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers, etc.

In the example in FIG. 1, virtual machines 131-138 are deployed to implement various applications that are designed according to a multi-tier architecture (also known as "n-tier architecture"). For example, the three-tier architecture distributes application functionality relating to presentation, application processing and data management over multiple virtual machines. Three example multi-tier applications are shown in FIG. 1. Relating to a first application, "VM1" 131 and "VM4" 134 execute respective web-tier (see "App1-w1" 141) and database-tier (see "App1-d1" 144) components. Also, "VM2" 132, "VM3" 133 and "VM7" 137 execute respective web-tier (see "App2-w1" 142), database-tier (see "App2-d1" 143) and application-tier (see "App2-a1" 147) components of a second application. Further, "VM5" 135, "VM6" 136 and "VM8" 138 execute respective web-tier (see "App3-w1" 145), database-tier (see "App3-d1" 146) and application-tier (see "App3-a1" 148) components of a third application.

To implement a multi-tier architecture, tier components communicate with each other via physical network 102. For example, to implement the first application, "VM1" 131 on host-A 110A communicates with "VM4" 134 on host-B 110B. Similarly, "VM2" 132 and "VM3" 133 on host-A 110A should be able to communicate with "VM7" 137 on host-C 110C to implement the second application, as well as "VM5" 135 and "VM6" 136 on host-B 110B with "VM8" 138 on host-C 110C for the third application. Communication between hosts generates east-west traffic, which conventional perimeter security solutions are not designed to inspect for security protection. As such, once an attacker successfully gets past the perimeter of the data center, there are few lateral controls to prevent threats from traversing from one host to another.

Micro-Segmentation

Micro-segmentation improves data center security by providing an internal control of east-west traffic within virtualized computing environment 100. For example, micro-segmentation facilitates segregation of virtual machines into virtual networks that can be managed using policies to ensure isolation and security at the network level. Conventionally, micro-segments are generally designed manually by users (e.g., network administrators), such as via an interface provided by management entity 160. In a greenfield environment, network administrators may apply micro-segmentation to new workloads.

In a brownfield environment, however, network administrators will need to consider existing applications that have been deployed and determine what policies need to be applied. Micro-segmentation should also be implemented with minimal disruption to the existing applications. Unfortunately, this is often very difficult because network administrators generally do not have a good visibility into how the existing applications are deployed, and how application components communicate with each other.

According to examples of the present disclosure, data center security may be improved using a more dynamic and automated approach to micro-segmentation. In particular, to take into account actual application usage, micro-segmentation may be performed based on application implementation information associated with applications (see 141-148) implementation by virtual machines 131-138. Once micro-segments are detected, security policies may be determined to improve security in virtualized computing environment 100.

Some examples will now be described using FIG. 2, which is a flowchart of example process 200 for entity 160 to perform micro-segmentation in virtualized computing environment 100. Example process 200 may include one or more operations, functions, or actions illustrated by one or more blocks, such as 210 to 230. The various blocks may be combined into fewer blocks, divided into additional blocks, and/or eliminated depending on the desired implementation. In the example in FIG. 1, example process 200 may be performed by management entity 160 using micro-segmentation module 162, or any alternative/additional module(s), etc.

Figure 2:
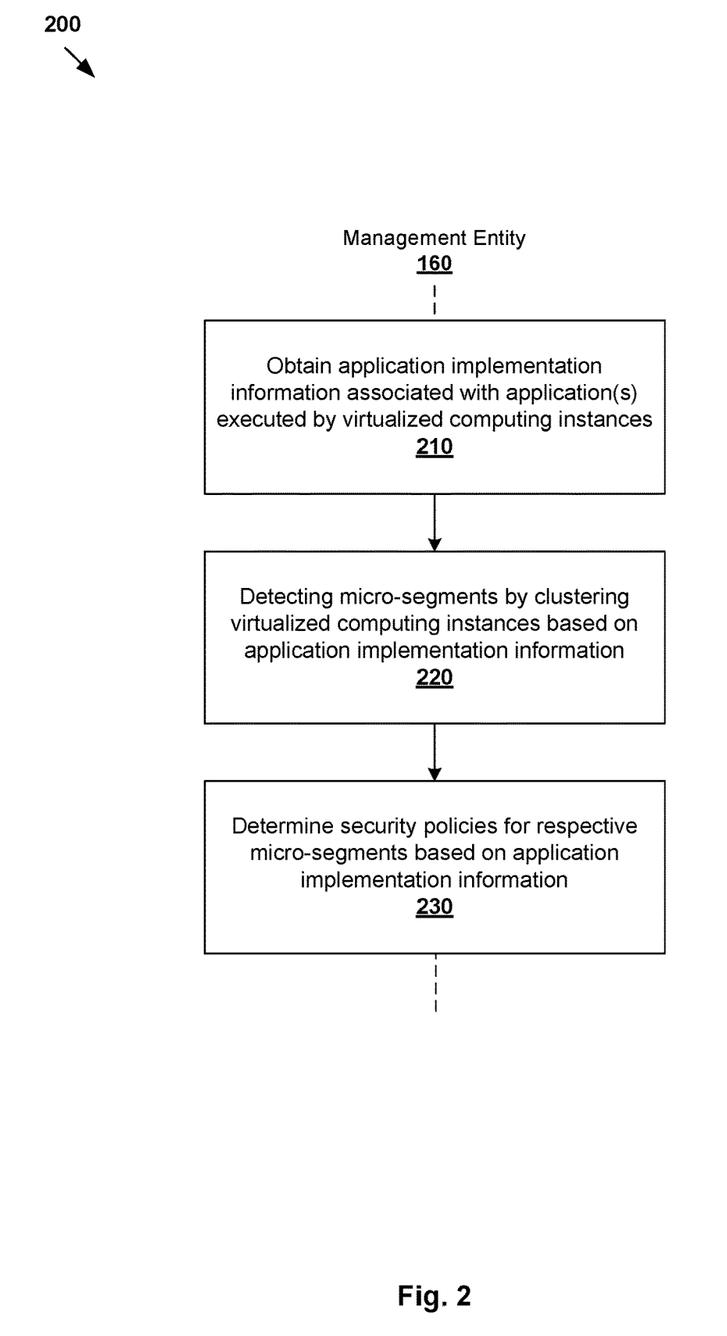
FIG. 2, which is a flowchart of the example process for an entity to perform micro-segmentation in the virtualized computing environment.

At 210 in FIG. 2, application implementation information associated with one or more applications executed by virtual machines 131-138 may be obtained. As used herein, the term "application implementation information" may refer generally to information associated with how an application is executed, such as network flow information among components of the application (e.g., network flows between "VM1" 131 and "VM4" 134); ownership information that sets out virtual machines' ownership of the application components (e.g., "VM1" 131 implements a web tier and "VM4" 134 implements a database tier of the same application), etc.

The term "obtain" may refer generally to management entity 160 retrieving or receiving the information from another entity, or accessing the information from storage (not shown for simplicity), etc. In the example in FIG. 1, management entity 160 may obtain the network flow information from collector 170 (e.g., non-persistent network flow collector). As will be described using FIG. 3, the network flow information may be a 5-tuple that includes source Internet Protocol (IP) address and source port number of first virtual machine (e.g., "VM1" 131) executing a first application component (e.g., "App1-w1" 141); destination IP address and destination port number of a second virtual machine (e.g., "VM4" 134) executing a second application component (e.g., "App1-d1" 144); and protocol (e.g., layer-4 Transmission Control Protocol (TCP)). Other application implementation information (e.g., ownership information) may be obtained from any suitable module of management entity 160 or an external source.

At 220 in FIG. 2, micro-segments are detected by clustering virtual machines 131-138 based on the application implementation information. As used herein, the term "micro-segment" may refer generally to a virtual network or logical network segment connecting one or more virtualized computing instances. For example in FIG. 1, three micro-segments are detected: (a) "MS1" 160 that includes "VM1" 131 and "VM4" 134; (b) "MS2" 162 that includes "VM2" 132, "VM3" 133 and "VM7" 137; and (c) "MS3" 164 that includes "VM5" 135, "VM6" 136 and "VM8" 138.

Clustering refers generally to a technique for partitioning a set of objects (e.g., virtual machines) into various clusters based on whether the objects have similar or dissimilar characteristics. Any suitable clustering algorithm may be used, such as graph clustering (e.g., Markov clustering), k-means clustering, hierarchical clustering, density-based clustering, grid-based clustering, model-based clustering, or a combination thereof, etc. By way of example, micro-segmentation using Markov clustering will be described further using FIG. 3 and FIG. 4. Virtual machines that are clustered into one micro-segment may have more similarity compared to those in a different micro-segment based on the application implementation information.

At 230 in FIG. 2, based on the application implementation information, security policies are determined for the respective detected micro-segments. A security policy may include one or more firewall rules for implementation by a micro-segment to protect traffic within, to or from the micro-segment. For example in FIG. 1, firewall is implemented in a distributed manner according to a distributed firewall architecture. In particular, host-A 110A implements first firewall engine 118A to enforce firewall rules for "VM1" 131, "VM2" 132 and "VM3" 133; second firewall engine 118B on host-B 110B for "VM4" 134, "VM5" 135 and "VM6" 136; and third firewall engine 118C on host-C 110C for "VM7" 137 and "VM8" 138. Example security policies will be discussed using FIG. 5.

Using example process 200, network security may be improved by detecting micro-segments, as well as determining security policies for the micro-segments, based on the application implementation information relating to actual application usage. As such, micro-segmentation may be performed more efficiently and dynamically without necessitating network administrators to (painstakingly) investigate how applications have been deployed in order to create the micro-segments. Once the micro-segments and security policies are configured, traffic travelling from one micro-segment to another (i.e., east-west traffic) may be controlled, thereby limiting an attacker's ability to move laterally in the data center.

In the following, various examples will be described using FIG. 3 to FIG. 8. In particular, example detailed processes to perform micro-segmentation will be described using FIG. 3, FIG. 4, FIG. 5 and FIG. 6. Example monitoring and troubleshooting of micro-segments will be described using FIG. 7 and FIG. 8.

Micro-Segmentation Using Clustering Algorithm

Figure 3:
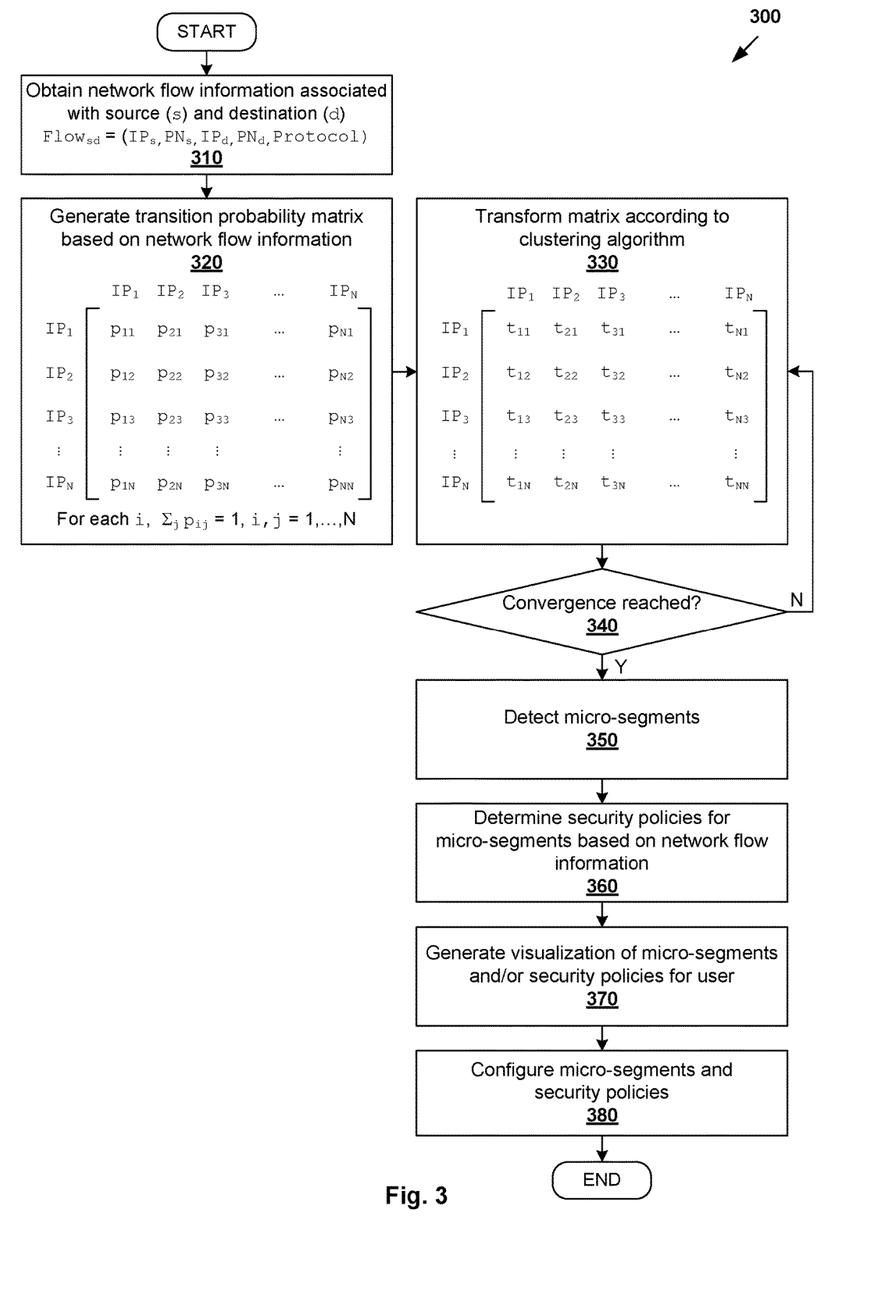
FIG. 3 is a flowchart of an example detailed process for an entity to perform micro-segmentation using a clustering algorithm.

FIG. 3 is a flowchart of example detailed process 300 for entity 160 to perform micro-segmentation using a clustering algorithm. Example process 300 may include one or more operations, functions, or actions illustrated by one or more blocks, such as 310 to 380. The various blocks may be combined into fewer blocks, divided into additional blocks, and/or eliminate d depending on the desired implementation. Example process 300 may be performed by entity 160 using micro-segmentation module 162, or any alternative/additional module(s), etc.

During micro-segmentation, the aim of a clustering algorithm is to partition a set of N virtual machines into multiple clusters, each representing a subset of the N virtual machines that have more similarity among them compared to those in a different cluster. In the following, an example will be discussed using Markov clustering, which is a graph clustering algorithm based on simulation of stochastic flow in a graph representing the set of N virtual machines. As explained using FIG. 2, any alternative and/or additional clustering algorithm(s) may be used.

At 310 in FIG. 3, management entity 160 obtains network flow information (i.e., an example of application implementation information in FIG. 2) associated with one or more applications executed by a set of N virtual machines from collector 170. In the example in FIG. 1, N=8 and a particular network flow from a source virtual machine (s) to a destination virtual machine (d) may be denoted as $flow_{sd}$. In one example, $flow_{sd}=(IP_s, PN_s, IP_d, PN_d, Protocol)$ may be a 5-tuple that includes source IP address $IP_s$, source port number $PN_s$, destination IP address $IP_d$, destination port number $PN_d$ and the protocol (e.g., TCP) used. In the case of s="VM1" 131 and d="VM4" 134, a network flow between them may be defined as $(IP_1, PN_1, IP_4, PN_4, TCP)$. $IP_1$ and $PN_1$ are associated with "VM1" 131 when executing "App1-w1" 141, and $IP_4$ and $PN_4$ with "VM4" 134 when executing "App1-d1" 144.

In practice, the network flow information may include any additional and/or alternative network flow parameters, such as source MAC address, destination MAC address, application identifier (ID) associated with a source and/or destination, etc. The network flow information may also include accounting information, such as number of network flows between a pair of virtual machines, frequency of packets transmitted, number of bytes transferred, duration of each network flow, packet timestamps, egress/ingress interfaces, traffic type, etc. The network flow information may be gathered by collector 170 over any suitable period of time (days, weeks, etc.) to capture traffic behavior during actual application usage.

Any suitable approach may be used by management entity 160 to obtain the network flow information, such as collector 170 pushing the information to management entity 160 (i.e., push model), management entity 160 sending queries to retrieve the information (i.e., pull model), a combination thereof, etc. In both cases, management entity 160 may obtain the network flow information using any suitable cloud management solution(s), such as VMware's vRealize Suite (e.g., Log Insight and vRealize Operations, both trademarks of VMware). Further, collector 170 may be any suitable third-party tool capable of capturing network flow information, such as NetFlow Logic (a trademark of Net-Flow Logic Corporation). Management entity 160 may analyze the network flow information using a custom analytics service.

At 320 in FIG. 3, a transition probability matrix is generated based on the network flow information. For a set of N virtual machines, the transition probability matrix may be an N-by-N matrix with columns and rows representing the N virtual machines. Value $p_{ij}$ at the $i^{th}$ column and $j^{th}$ row (i,j=1, . . . , N) represents the probability that an $i^{th}$ source (e.g., "VM1" 131 when i=1) communicates with a $j^{th}$ destination (e.g., "VM4" 134 when j=4). The total probability of each column is one, i.e., $\Sigma_{j=1}^{N} p_{ij}=1$. If the $i^{th}$ source does not communicate with a particular $j^{th}$ destination, corresponding $p_{ij}$ may be set to zero. Note that $p_{ii}$ may be set to zero for all i assuming that no virtual machine sends packets to itself. In practice, "self loop" weights may also be added to the transition probability matrix that results in non-zero diagonal values $p_{ii}$.

For the case of N=8, an example 8-by-8 transition probability matrix is shown in FIG. 3. The columns and rows represent the distinct IP addresses extracted from the network information flow, such as $IP_1$ associated with "VM1" 131; $IP_2$ associated with "VM2" 132; $IP_3$ associated with "VM3" 133; and so on. Using "VM1" 131 as an example source, $p_{1j}$ represents the probability of "VM1" 131 communicating with every other $j^{th}$ destination, including "VM2" 132 (see $p_{12}$); "VM3" 133 (see $p_{13}$); "VM4" 134 (see $p_{14}$); "VM5" 135 (see $p_{15}$); "VM6" 136 (see $p_{16}$); "VM7" 137 (see $p_{17}$); and "VM8" 138 (see $p_{18}$). In practice, a weight matrix may be first generated based on the network flow information, before normalizing each weight value ($w_{ij}$) to obtain corresponding probability value ($p_{ij}$).

At 330 in FIG. 3, the transition probability matrix is transformed using one or more operations into a transformed matrix. For a set of N virtual machines, the transformed matrix is also an N-by-N matrix with columns and rows representing the N virtual machines. Value $t_{ij}$ at the $i^{th}$ column and $j^{th}$ row (i,j=1, . . . , N) represents a transformed value associated with $p_{ij}$ for a pair of $i^{th}$ source and $j^{th}$ destination in the transition probability matrix.

The transformation operation(s) performed may depend on the clustering algorithm, such as expansion and inflation in the case of Markov clustering. Expansion is an operation responsible for allowing flow to connect different regions of a graph representing the N virtual machines using matrix multiplication based on an expansion parameter (e). Inflation is an operation responsible for both strengthening and weakening of current based on an inflation parameter (r) that influences the granularity of the resulting clusters.

At 340 in FIG. 3, it is determined whether convergence (i.e., steady state) has been reached, in that values $t_{ij}$ in the transformed matrix have converged. If not converged, another iteration of the transformation at 330 in FIG. 3 is performed using the transformed matrix from a previous iteration. Otherwise, once converged, example process 300 proceeds to 350 in FIG. 3. For example, in the case of Markov clustering, the transformed matrix generally converges to a doubly idempotent matrix, in which case a steady state is reached when every value in a single column has the same number (homogeneous).

At 350 in FIG. 3, micro-segments are detected based on the transformed matrix (i.e., resulting matrix after the final iteration). For example, in the case of Markov clustering, micro-segments are detected based on clusters obtained from the transformed matrix, such as based on "attractors" that have at least one positive value on their corresponding rows in the transformed matrix.

Figure 4:
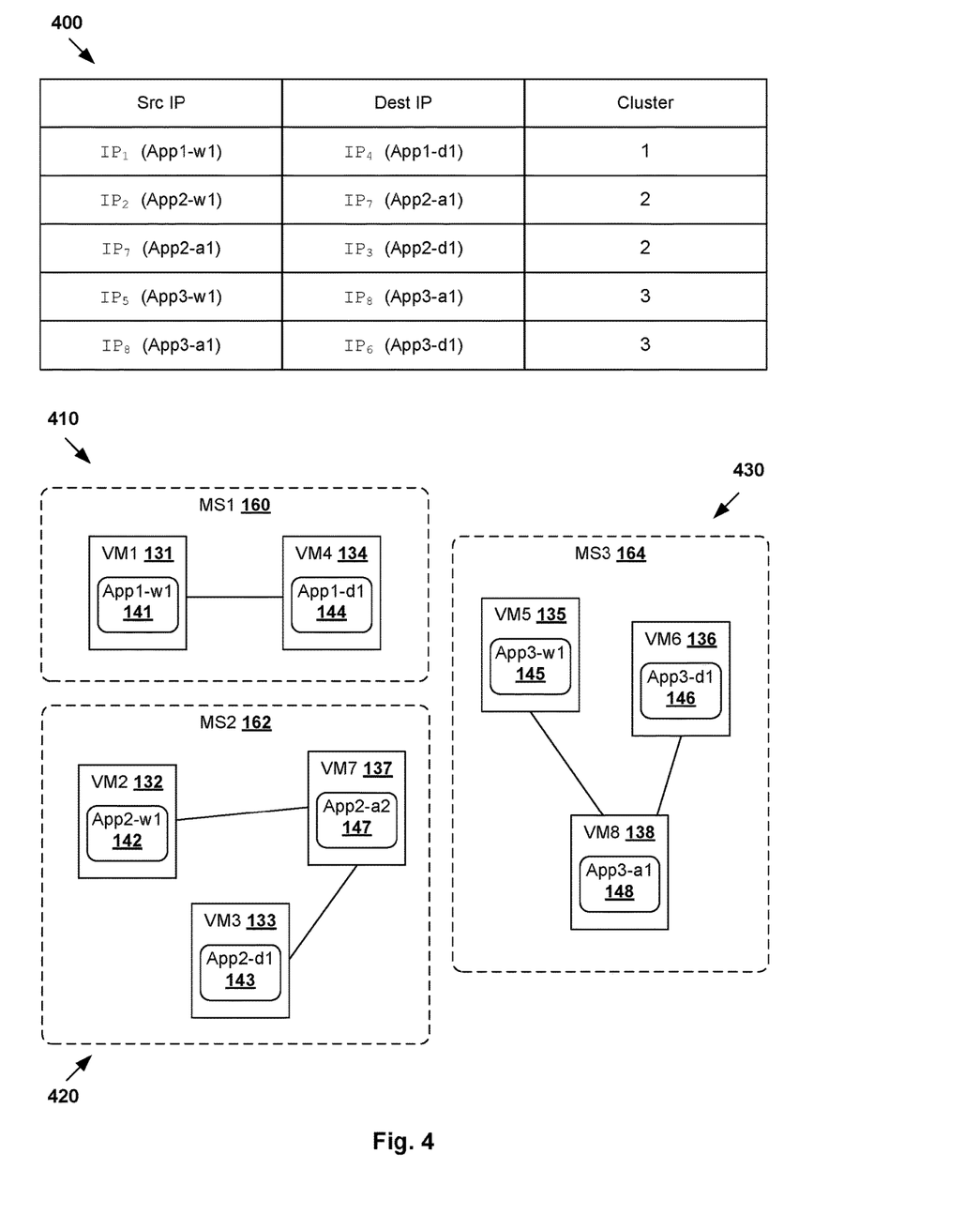
FIG. 4, which is a schematic diagram illustrating example micro-segments detected in the virtualized computing environment in FIG. 1 according to the example process in FIG. 3.

Some examples are shown in FIG. 4, which is a schematic diagram illustrating example micro-segments detected in virtualized computing environment 100 in FIG. 1 according to example process 300 in FIG. 3. Table 400 sets out three clusters that are identified from the network flow information: first cluster=($IP_1$, $IP_4$) associated with "App1"; second cluster=($IP_2$, $IP_3$, $IP_7$) associated with "App2"; and third cluster with ($IP_5$, $IP_6$, $IP_8$) associated with "App3." The corresponding micro-segments are:

(a) At 410 in FIG. 4, first micro-segment "MS1" 160 includes two members: "VM1" 131 executing "App1-w1" 141 (i.e., web tier of a first application) and "VM4" 134 executing "App1-d1" 144 (i.e., database tier of the first application).

(b) At 420 in FIG. 4, second micro-segment "MS2" 162 includes three members: "VM2" 132 executing "App2-w1" 142 (i.e., web tier of a second application), "VM3" 133 executing "App2-d1" 143 (i.e., database tier of the second application) and "VM7" 137 executing "App2-a1" 147 (i.e., application tier of the second application).

(c) At 430 in FIG. 4, third micro-segment "MS3" 164 also includes three members: "VM5" 135 executing "App3-w1" 145 (i.e., web tier of a third application), "VM6" 136 executing "App3-d1" 146 (i.e., database tier of the third application) and "VM8" 138 executing "App3-a1" 148 (i.e., application tier of the third application).

In practice, other types of application implementation information may be useful to detect micro-segments. For example, network flow information collected over a certain period of time may not accurately capture the interaction between virtual machines executing tier components of the same application, especially if there are no network flows between them during that period. In this case, other application implementation information, such as virtual machines' ownership of the components of an application, structure of the application, may be used to guide or refine the results obtained from the clustering algorithm. Further, any suitable criteria may be imposed on the clustering algorithm to affect how micro-segments are defined. In the example in FIG. 4, each detected micro-segment 160/162/164 includes all tiers corresponding application. In practice, multiple micro-segments may be defined for a particular application (to be discussed using "App4" in FIG. 7).

Automated Security Policy Design

Referring now to 360 in FIG. 3, security policies are determined for the detected micro-segments based on application implementation information associated with each micro-segment. Each security policy may include one or more firewall rules for implementation by distributed firewall engine 118A/118B/118C of the relevant host 110A/110B/110C. In one example, based on the network flow information flow$_{sd}$=($IP_s$, $PN_s$, $IP_d$, $PN_d$, Protocol), a firewall rule may be recommended to allow or deny packets from a source (s) to a destination (d) based on their past communication behavior.

Figure 5:
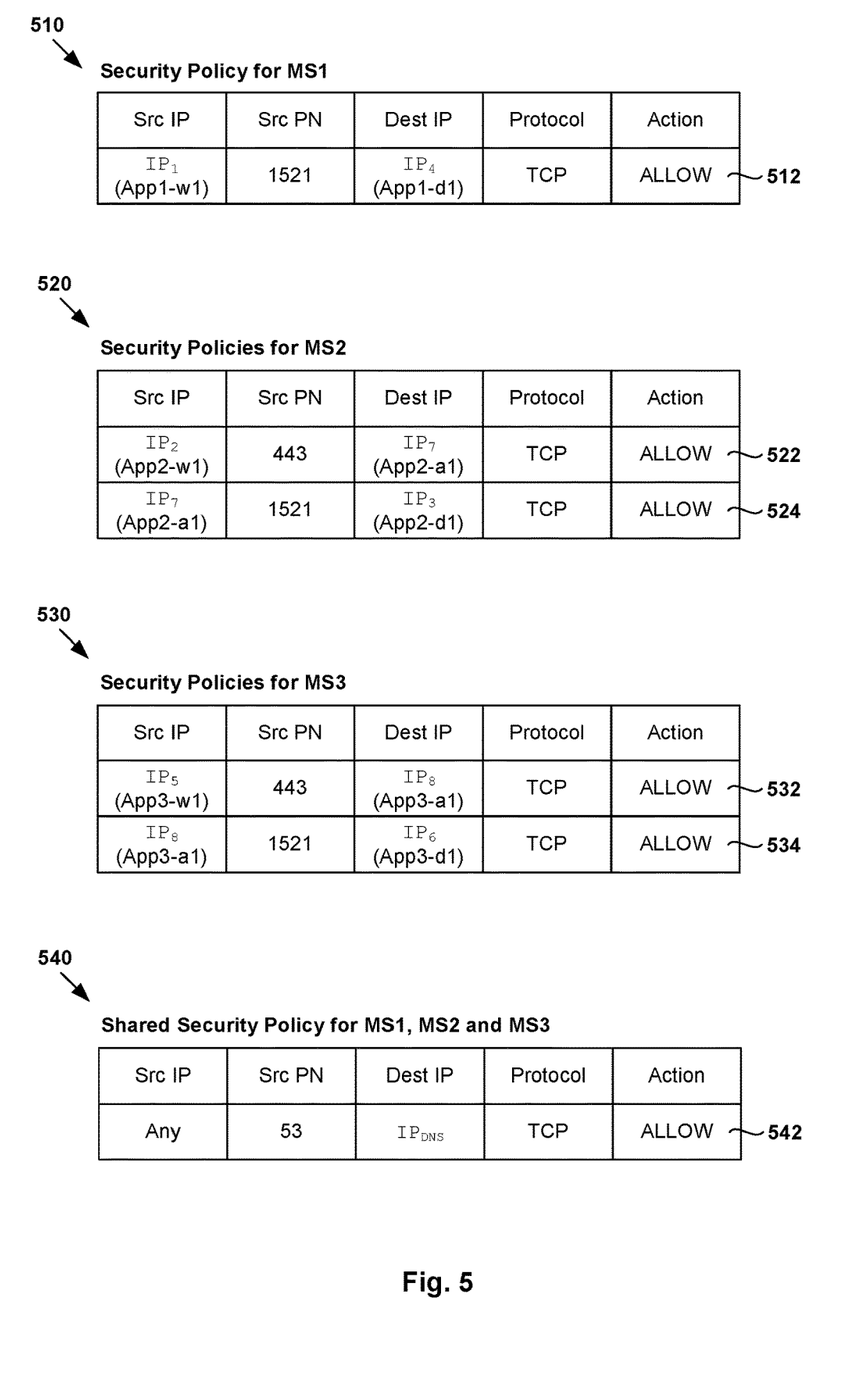
FIG. 5 is a schematic diagram illustrating example security policies for micro-segments that are detected in the virtualized computing environment in FIG. 1 according to the example process in FIG. 3.
Figure 6:
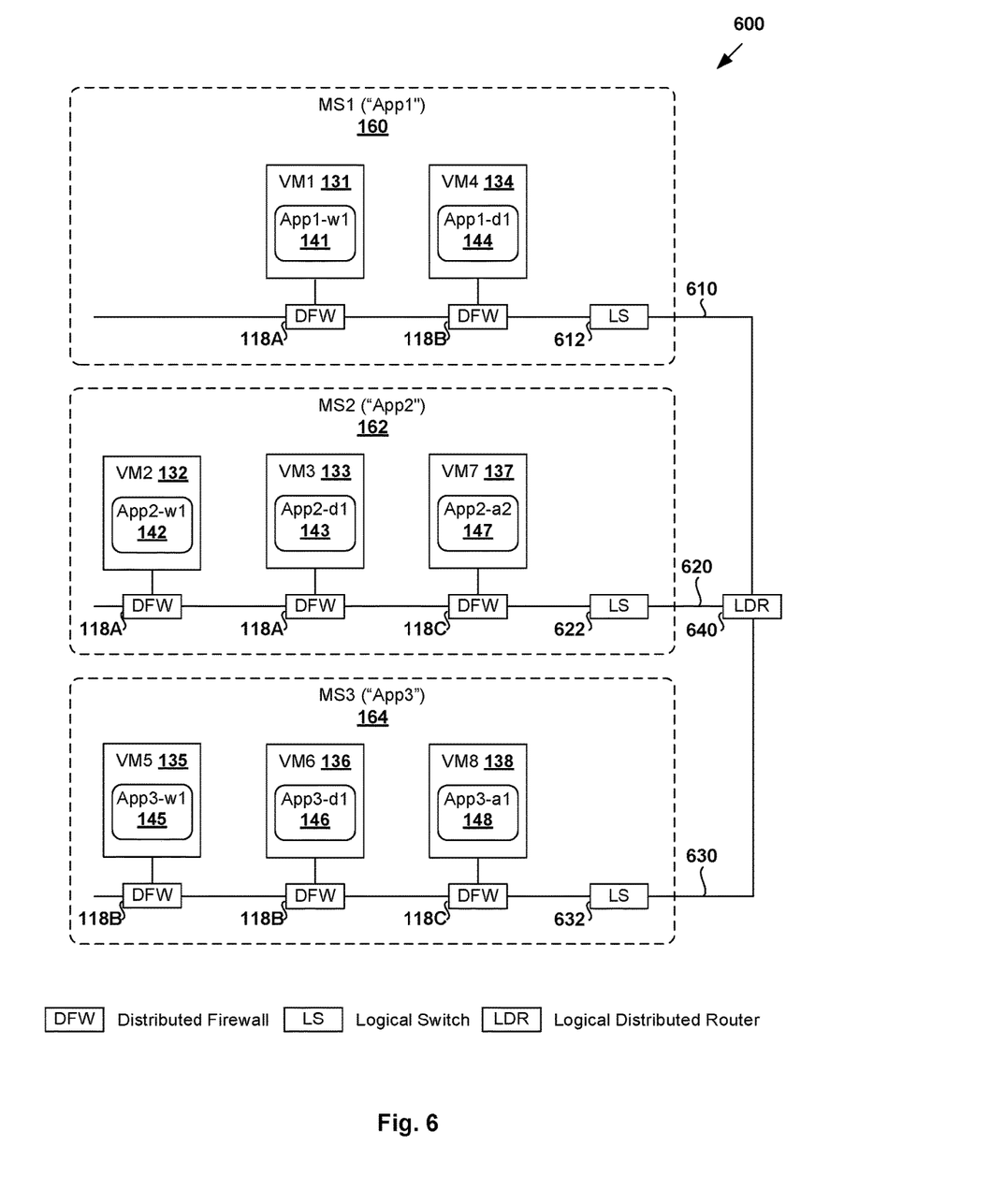
FIG. 6 is a schematic diagram illustrating a logical view of the virtualized computing environment in FIG. 1 after micro-segmentation.

Some examples are shown in FIG. 5, which is a schematic diagram illustrating example security policies for micro-segments that are detected in virtualized computing environment 100 in FIG. 1 according to example process 300 in FIG. 3. The following security policies may be proposed for "MS1" 160, "MS2" 162 and "MS3" 164.

(a) At 510 in FIG. 5, based on the network flow information associated with "MS1" 160, management entity 160 observes that "VM1" 131 (i.e., web-tier "App1-w1" 141) communicates with "VM4" 134 (i.e., database tier "App1-d1" 144). Firewall rule 512 is proposed for "MS1" 160 to allow communication from source "VM1" 131 to destination "VM4" 134. Firewall rule 512 is designed for implementation by firewall engine 118A of host-A 110A hosting "VM1" 131 and/or firewall engine 118B of host-B 110B hosting "VM4" 134.

(b) At 520 in FIG. 5, based on the network flow information associated with "MS2" 162, management entity 160 observes that "VM2" 132 (i.e., web tier "App2-w1" 142) sends packets to "VM7" 137 (i.e., application tier "App2-a1" 147), which in turn sends packets to "VM3" 133 (i.e., database tier "App2-d1" 143). In this case, firewall rule 522 in FIG. 5 is proposed to allow packets from "VM2" 132 to "VM7" 137 using source port number=443 and protocol=TCP. Similarly, firewall rule 524 is to allow packets from "VM7" 137 to "VM3" 133 using source port number=1521 and protocol=TCP. Firewall rules 522, 524 may be implemented by firewall engine 118A of host-A 110A hosting "VM2" 132 and "VM3" 133, and/or firewall engine 118C of host-C 110C hosting "VM7" 137.

(c) At 530 in FIG. 5, based on the network flow information associated with "MS3" 164, management entity 160 observes that "VM5" 135 (i.e., web tier "App3-w1" 145) sends packets to "VM8" 138 (i.e., application tier "App3-a1" 148), which in turn sends packets to "VM6" 136 (i.e., database tier "App3-d1" 146). In this case, firewall rule 532 is to allow packets from "VM5" 135 to "VM8" 138 using source port number=443 and protocol=TCP. Similarly, firewall rule 534 is to allow packets from "VM8" 138 to "VM6" 136 using source port number=1521 and protocol=TCP. Firewall rules 532, 534 are designed for implementation by firewall engine 118B and/or firewall engine 118C.

(d) At 540 in FIG. 5, one or more shared policies may be proposed for multiple micro-segments. For example, shared firewall rule 542 is to allow communication with an external server learned from the network flow information, such as a Domain Name Service (DNS) server 180 in FIG. 1. Shared firewall rule 542 may be implemented in "MS1" 160, "MS2" 162 and "MS3" 164 using by firewall engine 118A/118B/118C of each host 110A/110B/110C.

Although not shown in FIG. 5, security policies that control communication between different micro-segments may also be determined, such as from "VM1" 131 in "MS1" 160 to "VM3" 133 in "MS2" 162. Again, security policies for inter-segment communication may be designed based on network flow information. For example, packets to an unidentified destination IP address, and/or from an unidentified source IP address, may be denied and reported to a network administrator.

Micro-Segment and Security Policy Configuration

Referring to FIG. 3 again, particularly at 370, micro-segments detected at block 350 and/or security policies determined at block 360 may be presented to a user (e.g., network administrator, etc.) as recommendations. In one example, a cloud management platform (e.g., vRealize Operations, a trademark of VMware, Inc.) may be used to present a graphical visualization of micro-segments 160-164 in FIG. 4 and/or corresponding security policies 510-540 in FIG. 5. The user may then review the recommendations, and make any necessary changes based on other considerations.

At 380 in FIG. 3, management entity 160 configures hosts 110A-110C to implement micro-segments 160-164 and security policies 510-540. This may involve configuration of logical networking resources such as logical switches, logical routers, distributed firewall engines, logical load balancers, etc. Some examples will be discussed using FIG. 6, which is a schematic diagram illustrating logical view 600 of virtualized computing environment 100 in FIG. 1 after micro-segmentation. It should be understood that, depending on the desired implementation, logical view 600 may include additional and/or alternative component(s) than that shown in FIG. 6.

In relation to micro-segment configuration, management entity 160 may configure "MS1" 160, "MS2" 162 and "MS3" 164 as virtual networks to isolate members of one micro-segment from those in a different micro-segment. For example in FIG. 1, three layer-2 logical segments (see 610, 620, 630) are configured for respective "MS1" 160, "MS2" 162 and "MS3" 164. Each logical segment includes a logical switch (see 612, 622, 632 that connects members of corresponding micro-segment. For example, first logical switch 612 is configured to connect "VM1" 131 and "VM4" 134; second logical switch 622 to connect "VM2" 132, "VM3" 133 and "VM7" 137; and third logical switch 632 to connect "VM5" 135, "VM6" 136 and "VM8" 138. In practice, any suitable technology may be used to implement the virtual networks or logical segments, such as Virtual Local Area Network (VLAN), Virtual eXtensible Local Area Network (VXLAN), etc. Logical distributed router 640 is to facilitate communication between different micro-segments.

In relation to security policy configuration, management entity 160 may configure host-A 110A, host-B 110B and host-C 110C to implement security policies 510-540 in FIG. 5. In particular, to protect communication within "MS1" 161, management entity 160 may instruct firewall engine 118A associated with "VM1" 131 and/or firewall engine 118B associated with "VM4" 134 to implement firewall rule 512. For "MS2" 162, management entity 160 may instruct firewall engine 118A associated with "VM2" 132 and "VM3" 133, and/or firewall engine 118C associated with "VM7" 137 to implement firewall rules 522, 524. For "MS3" 164, firewall engine 118B associated with "VM5" 135 and "VM6" 136, and/or firewall engine 118C associated with "VM8" 138 are instructed to implement firewall rules 532, 534. Further, management entity 160 may instruct each firewall engine 118A/118B/118C to implement shared policy 540.

In practice, network packets may be filtered according to firewall rules at any point along a datapath from a virtual machine to its associated physical NIC. In the above examples, the firewall rules may be enforced by firewall engines 118A-118C at respective virtual switches 116A-116C. In another example, a filter component may be incorporated into each virtual NIC (not shown for simplicity) associated with a virtual machine. The filter component at the virtual NIC enforces firewall rules associated with the virtual machine, while the firewall rules are maintained by firewall engine 118A-118C.

Figure 7:
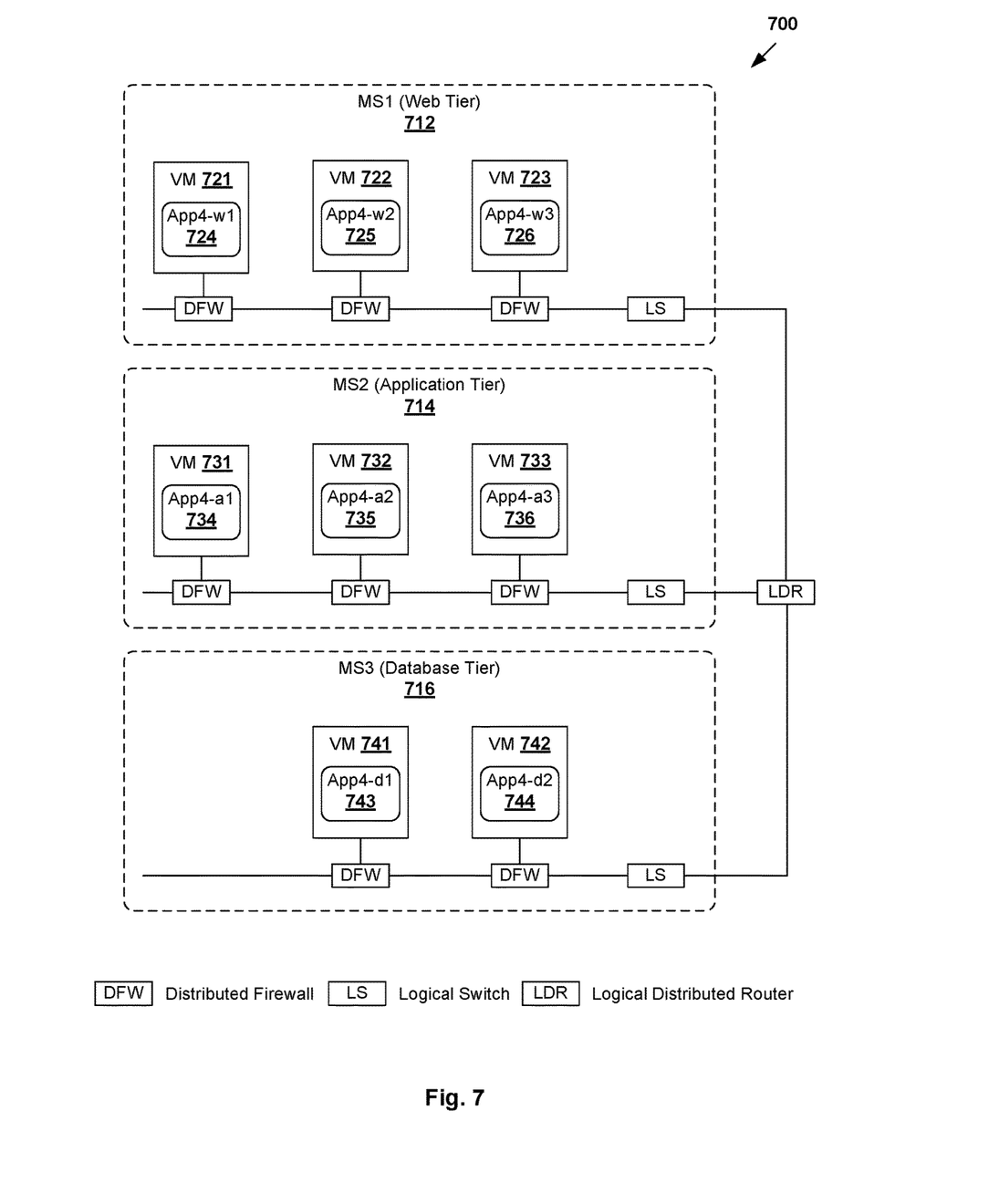
FIG. 7 is a schematic diagram illustrating a logical view of another example virtualized computing environment after micro-segmentation.

Although the above examples involve analyzing network flow information of multiple applications, it should be appreciated that micro-segmentation may be performed for virtual machines implementing the same application. For example, FIG. 7 is a schematic diagram illustrating logical view 700 of another example virtualized computing environment after micro-segmentation. In this example, three micro-segments are configured for different tiers of the same application: (a) "MS1" 712 includes virtual machines 721-723 executing web-tier components 724-726; (b) "MS2" 714 includes virtual machines 731-733 executing application-tier components 734-736; and (c) "MS3" 714 includes virtual machines 731-732 executing database-tier components 733-734. Similarly, logical switches, logical router(s)

and distributed firewalls may be configured to implement the micro-segments and security policies designed by management entity 160 based on network flow information associated with the application.

Monitoring and Performance Enhancement

Figure 8:
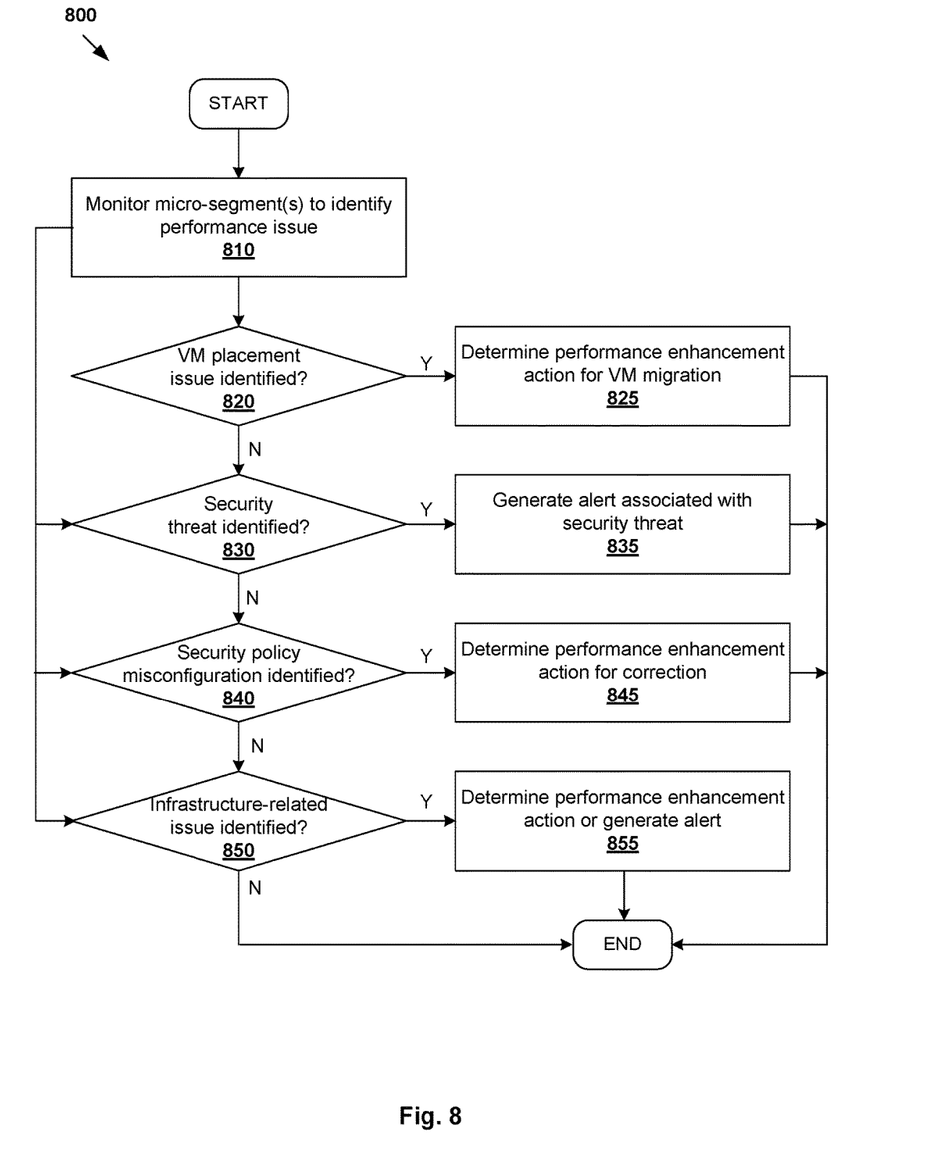
FIG. 8 is a flowchart of an example process for an entity to monitor micro-segments in the virtualized computing environment.

FIG. 8 is a flowchart of example process 800 for entity 160 to monitor micro-segments in virtualized computing environment 100. Example process 800 may include one or more operations, functions, or actions illustrated by one or more blocks, such as 810 to 855. The various blocks may be combined into fewer blocks, divided into additional blocks, and/or eliminate d depending on the desired implementation. Example process 800 may be performed by entity 160 using micro-segmentation module 162, or any alternative/additional module(s), etc.

At 810 in FIG. 8, management entity 160 may monitor micro-segment 160/162/164 to identify a performance issue. Any suitable information may be used, such as application implementation information, network infrastructure information, micro-segment information, a combination thereof, etc. As explained, application implementation information may include network flow information relating to network flows within, to and from a particular micro-segment (e.g., within "MS1" 160, from "MS1" 160 to "MS2" 162 or DNS server 180, etc.). Similar to the example in FIG. 3, the network flow information flow may be obtained from collector 170. Other application implementation information may include information identifying virtual machines' ownership of application components, etc.

Micro-segment information may include membership information of a particular micro-segment (e.g., "VM1" 131 and "VM4" 134 are in "MS1" 160) and corresponding security policies (e.g., firewall rules in FIG. 5). Network infrastructure information may include information relating to the underlying physical or virtual infrastructure. Physical infrastructure information (e.g., obtained from VMware's Management Pack for Network Devices (MPND), etc.) may identify placement of virtual machines, number of hops between a pair of hosts, intermediate physical switches connecting a pair of hosts, etc. Virtual infrastructure information may identify logical segments or virtual networks, virtual machines' membership of virtual networks, etc. Some example performance issues are discussed below.

(a) Virtual Machine Placement

At 820 in FIG. 8, a performance issue relating to virtual machine placement may be identified. For example in FIG. 1, "VM2" 132, "VM3" 133 and "VM7" 137 are assigned to the same micro-segment, i.e., "MS2" 162. Using a combination of micro-segment information, virtual machines' ownership of components, network flow information and network infrastructure information, management entity 160 may observe that "VM7" 137 on host-C 110C communicates with "VM2" 132 and "VM3" 133 are on host-A 110A to execute web, database and application tiers of a multi-tier application.

At 825 in FIG. 8, in response to the detection of the virtual machine placement issue, a performance enhancement action may be determined. In this case, the action may be migration of "VM7" 137 from host-C 110C to host-A 110A to reduce packet latency within "MS2" 162. This also reduces the processing burden on intermediate switches connecting host-A 110C and host-C 110C. Depending on user's preferences, the performance enhancement action may be performed automatically or after confirmation by a network administrator.

(b) Security-Related Issue(s)

At 830 in FIG. 8, a security threat may be identified from the network flow information. For example, "VM1" 131 and "VM4" 134 in "MS1" 160 share the same DNS server 180. If communication from "MS1" 160 to a different DNS server is detected, there may be a security threat because of a rogue DNS server on the network. In this case, at 835 in FIG. 8, an alert may be generated to inform a network administrator of the anomaly.

At 840 in FIG. 8, a security policy may be identified, such as by detecting that virtual machines that have communicated in the past but are no longer communicating. For example in FIG. 1, "VM1" 131 is detected to have stopped communication with "VM4" 134 within "MS1" 160. To troubleshoot this issue, an expected security policy (e.g., firewall rule 512 in FIG. 5) may be compared with a current security policy for "MS1" 160. Based on the comparison, a misconfigured firewall rule that blocks all traffic between "VM1" 131 and "VM4" 134 may be identified. At 845 in FIG. 8, the performance enhancement action may be a proposed correction of the misconfigured firewall rule.

(c) Infrastructure-Related Issue(s)

At 850 in FIG. 8, an infrastructure-related issue may be identified. In one example, "MS1" 160 is detected with two virtual machines (i.e., "VM1" 131 and "VM4" 134). Based on network infrastructure information from MPND, it is observed that a network switch connecting host-A 110A and host-B 110B in the underlying physical infrastructure is experiencing high latency due to capacity constraints. In this case, based on the detected micro-segments and network flow information, micro-segments (e.g., "MS1" 160) impacted by this operational issue as a result of using this switch may be identified. At 855 in FIG. 8, a performance enhancement action might be proposed or an alert generated.

In another example, consider a different scenario in which "VM9", "VM10" and "VM11" (not shown for simplicity) are executing the same application, but do not belong to the same virtual network (VN), such as "VM9" and "VM10" in VN1 and "VM11" in VN2. By considering which virtual machines are running the same application during micro-segmentation, a performance issue relating to "VM11" may be identified, such as sudden disconnection. Virtual network configuration may also be reviewed to identify possible performance issues. In this case, the performance enhancement action may be to create a virtual network that includes "VM9", "VM10" and "VM11".

In practice, management entity 160 may also alert the network administrator if the configuration of a micro-segment has been changed or if other virtual machines are added or removed, etc. Although some examples are provided here, it should be understood that micro-segment monitoring may be applied in other situations.

Computer System

Figure 9:
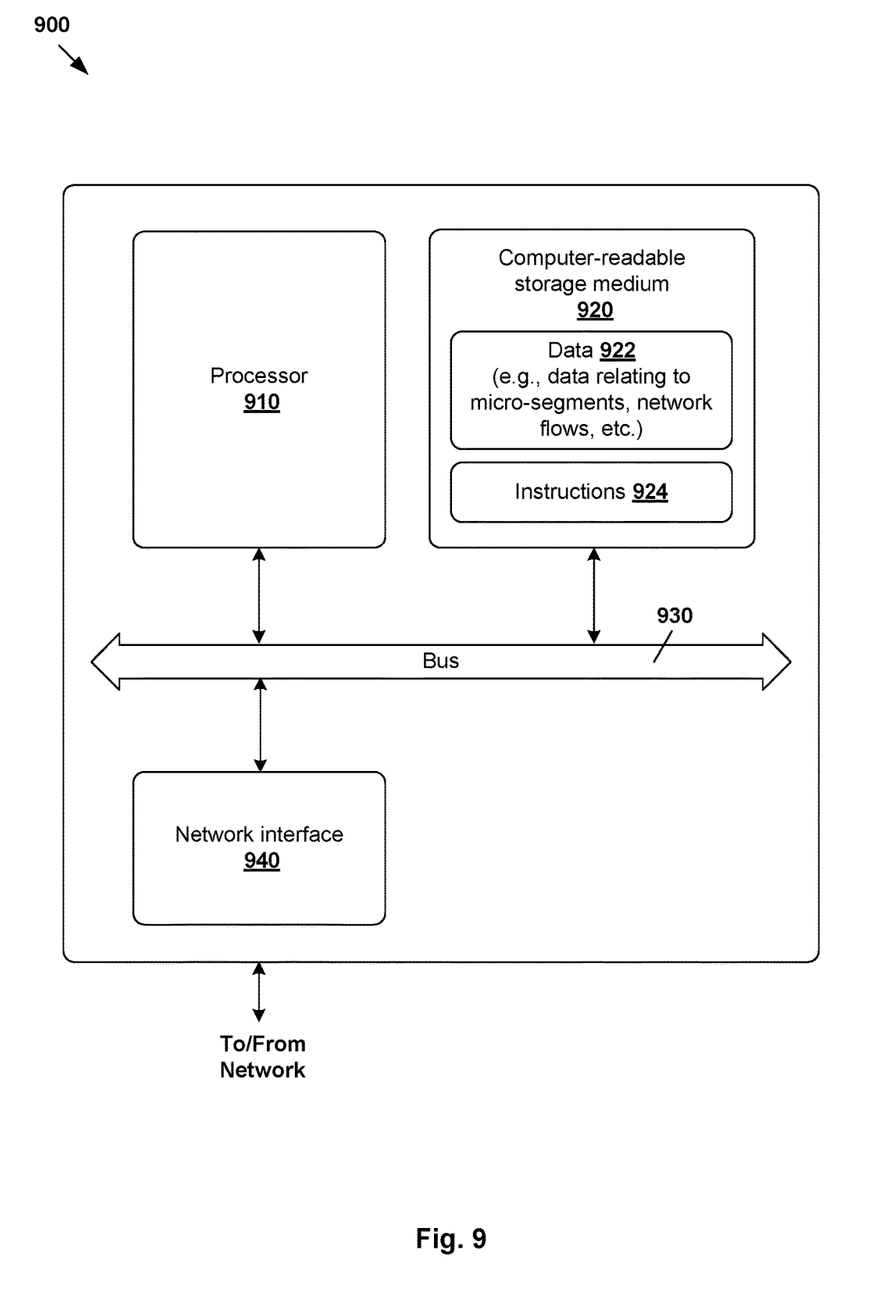
FIG. 9 is a schematic diagram illustrating an example computer system capable of acting as a management entity.

The above examples can be implemented by hardware (including hardware logic circuitry), software or firmware or a combination thereof. FIG. 9 is a schematic diagram illustrating example computer system 900 capable of acting as management entity 160. Example computer system or computing device 900 may include processor 910, computer-readable storage medium 920, network interface 940, and bus 930 that facilitates communication among these illustrated components and other components.

Processor 910 is to perform processes described herein with reference to the drawings. Computer-readable storage medium 920 may store any suitable data 922, such as data relating to applications, authentication providers, authentication sources, etc. Computer-readable storage medium 920 may further store computer-readable instructions 924 which, in response to execution by processor 910, cause processor 910 to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for an entity to perform micro-segmentation in a virtualized computing environment that includes multiple hosts, the method comprising:
    obtaining application implementation information associated with one or more applications implemented by multiple virtualized computing instances, wherein each of the multiple virtualized computing instances is supported by one of the multiple hosts;
    detecting micro-segments by clustering the multiple virtualized computing instances based on the application implementation information, wherein each of the detected micro-segments includes one or more of the multiple virtualized computing instances that have more similarity compared to those in a different detected micro-segment; and
    based on the application implementation information, determining security policies for respective detected micro-segments.

2. The method of claim 1, wherein detecting the micro-segments comprises:
    detecting the micro-segments based on application implementation information that includes one or more of the following: network flow information associated with network flows between multiple components of a particular application; and ownership information associated with a particular virtualized computing instance's ownership of one of the multiple components of the particular application.

3. The method of claim 2, wherein determining the security policies comprises:
    based on network flow information associated with a source and a destination, determining a distributed firewall rule to allow or deny communication between the source and destination, wherein the source is a first virtualized computing instance in a first micro-segment, and the destination is a second virtualized computing instance in the first micro-segment or a second micro-segment, or an external server.

4. The method of claim 1, wherein the method further comprises:
    configuring the multiple hosts to implement the detected micro-segments and/or the one or more security policies.

5. The method of claim 1, wherein applying the clustering algorithm comprises:
    determining a transition probability matrix based on the application implementation information; and
    iteratively transforming the transition probability matrix until convergence is reached to detect the micro-segments.

6. The method of claim 1, wherein the method further comprises:
    monitoring the detected micro-segments to identify a performance issue that affects at least one of the detected micro-segments; and
    in response to identifying the performance issue, generating an alert or determining a performance enhancement action.

7. The method of claim 6, wherein monitoring the detected micro-segments to identify the performance issue comprises one or more of the following:
    identifying a sub-optimal placement of a particular virtualized computing instance in a particular micro-segment;
    identifying a security threat associated with a particular micro-segment;
    identifying a misconfiguration associated with a particular security policy; and
    identifying an infrastructure issue associated with a particular micro-segment.

8. A non-transitory computer-readable storage medium that includes a set of instructions which, in response to execution by a processor of a computer system, cause the processor to perform a method of micro-segmentation in a virtualized computing environment that includes multiple hosts, the method comprising:

obtaining application implementation information associated with one or more applications implemented by multiple virtualized computing instances, wherein each of the multiple virtualized computing instances is supported by one of the multiple hosts;

detecting micro-segments by clustering the multiple virtualized computing instances based on the application implementation information, wherein each of the detected micro-segments includes one or more of the multiple virtualized computing instances that have more similarity compared to those in a different detected micro-segment; and based on the application implementation information, determining security policies for respective detected micro-segments.

9. The non-transitory computer-readable storage medium of claim 8, wherein detecting the micro-segments comprises:

detecting the micro-segments based on application implementation information that includes one or more of the following: network flow information associated with network flows between multiple components of a particular application; and ownership information associated with a particular virtualized computing instance's ownership of one of the multiple components of the particular application.

10. The non-transitory computer-readable storage medium of claim 9, wherein determining the security policies comprises:

based on network flow information associated with a source and a destination, determining a distributed firewall rule to allow or deny communication between the source and destination, wherein the source is a first virtualized computing instance in a first micro-segment, and the destination is a second virtualized computing instance in the first micro-segment or a second micro-segment, or an external server.

11. The non-transitory computer-readable storage medium of claim 8, wherein the method further comprises:

configuring the multiple hosts to implement the detected micro-segments and/or the one or more security policies.

12. The non-transitory computer-readable storage medium of claim 8, wherein applying the clustering algorithm comprises:

determining a transition probability matrix based on the application implementation information; and iteratively transforming the transition probability matrix until convergence is reached to detect the micro-segments.

13. The non-transitory computer-readable storage medium of claim 8, wherein the method further comprises:

monitoring the detected micro-segments to identify a performance issue that affects at least one of the detected micro-segments; and in response to identifying the performance issue, generating an alert or determining a performance enhancement action.

14. The non-transitory computer-readable storage medium of claim 13, wherein monitoring the detected micro-segments to identify the performance issue comprises one or more of the following:

identifying a sub-optimal placement of a particular virtualized computing instance in a particular micro-segment;

identifying a security threat associated with a particular micro-segment;

identifying a misconfiguration associated with a particular security policy; and identifying an infrastructure issue associated with a particular micro-segment.

15. A computer system configured to micro-segmentation in a virtualized computing environment that includes multiple hosts, the computer system comprising:

a processor; and a non-transitory computer-readable medium having stored thereon instructions that, when executed by the processor, cause the processor to:

obtain application implementation information associated with one or more applications implemented by multiple virtualized computing instances, wherein each of the multiple virtualized computing instances is supported by one of the multiple hosts;

detect micro-segments by clustering the multiple virtualized computing instances based on the application implementation information, wherein each of the detected micro-segments includes one or more of the multiple virtualized computing instances that have more similarity compared to those in a different detected micro-segment; and based on the application implementation information, determine security policies for respective detected micro-segments.

16. The computer system of claim 15, wherein the instructions for detecting the micro-segments cause the processor to:

detect the micro-segments based on application implementation information that includes one or more of the following: network flow information associated with network flows between multiple components of a particular application; and ownership information associated with a particular virtualized computing instance's ownership of one of the multiple components of the particular application.

17. The computer system of claim 16, wherein the instructions for determining the security policies cause the processor to:

based on network flow information associated with a source and a destination, determine a distributed firewall rule to allow or deny communication between the source and destination, wherein the source is a first virtualized computing instance in a first micro-segment, and the destination is a second virtualized computing instance in the first micro-segment or a second micro-segment, or an external server.

18. The computer system of claim 15, wherein the instructions further cause the processor to:

configure the multiple hosts to implement the detected micro-segments and/or the one or more security policies.

19. The computer system of claim 15, wherein the instructions for applying the clustering algorithm cause the processor to:

determine a transition probability matrix based on the application implementation information; and iteratively transform the transition probability matrix until convergence is reached to detect the micro-segments.

20. The computer system of claim 15, wherein the instructions further cause the processor to:

monitor the detected micro-segments to identify a performance issue that affects at least one of the detected micro-segments; and in response to identifying the performance issue, generate an alert or determine a performance enhancement action.

21. The computer system of claim 20, wherein the instructions for monitoring the detected micro-segments to identify the performance issue cause the processor to perform one or more of the following:

identify a sub-optimal placement of a particular virtualized computing instance in a particular micro-segment;

identify a security threat associated with a particular micro-segment;

identify a misconfiguration associated with a particular security policy; and identify an infrastructure issue associated with a particular micro-segment.

\* \* \* \* \*